United States Patent [19]

Verbakel

[11] 4,131,973
[45] Jan. 2, 1979

[54] DEVICE AND METHOD FOR MAKING A CUT IN THE ANAL REGION OF A BIRD

[75] Inventor: Godefridus H. W. Verbakel, Helmond, Netherlands

[73] Assignee: Stork Brabant B.V., Boxmeer, Netherlands

[21] Appl. No.: 654,041

[22] Filed: Jan. 30, 1976

[30] Foreign Application Priority Data

Feb. 7, 1975 [NL] Netherlands .......................... 7501521

[51] Int. Cl.² ............................................. A22C 21/00
[52] U.S. Cl. ............................................. 17/52; 17/11
[58] Field of Search ....................... 17/11, 52, 45, 44.1, 17/44.2

[56] References Cited

U.S. PATENT DOCUMENTS

| 3,958,303 | 5/1976 | Scheier et al. | 17/11 |
| 3,979,793 | 9/1976 | Hazenbroek | 17/11 |
| 3,986,231 | 10/1976 | Harben, Jr. | 17/45 |
| 4,004,320 | 1/1977 | Scheier et al. | 17/11 |

Primary Examiner—Russell R. Kinsey
Assistant Examiner—John J. Wilson
Attorney, Agent, or Firm—Edmund M. Jaskiewicz

[57] ABSTRACT

Device for making a cut in the anal region of a bird includes
a first member with a stop for the back of the bird and
a lower second member comprising a stop for the breast of the bird. At least one of these members can embrace the bird in a substantially horizontal plane. There is further
a third member having a stop in order to delimit the movement of the bird moved upwardly in a vertical direction.

2 Claims, 23 Drawing Figures

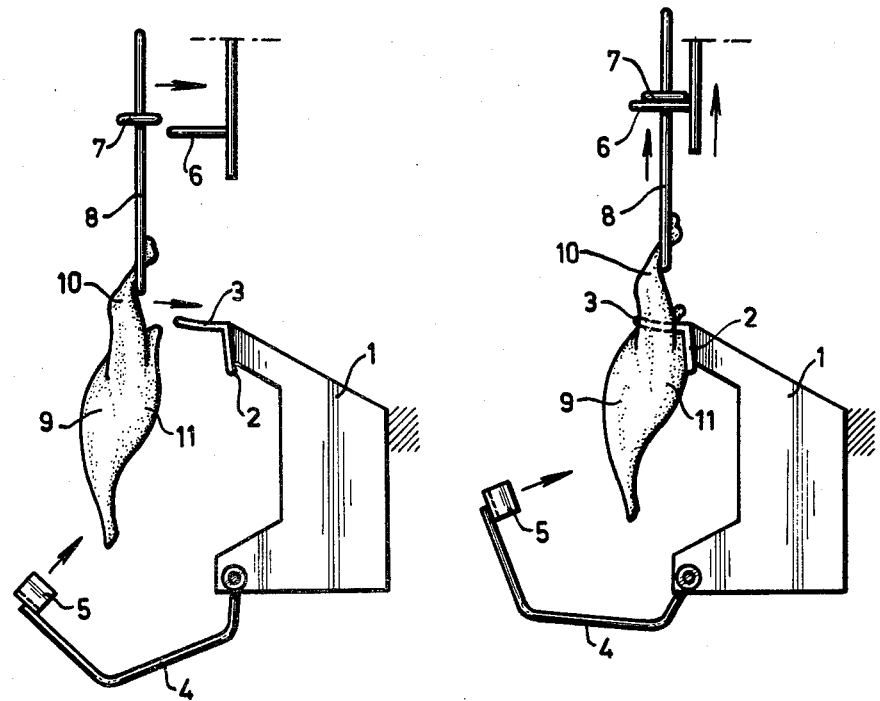
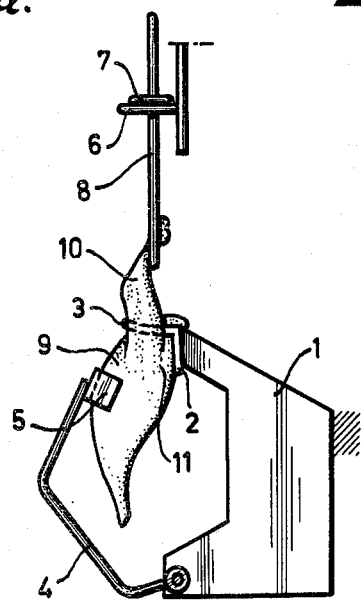

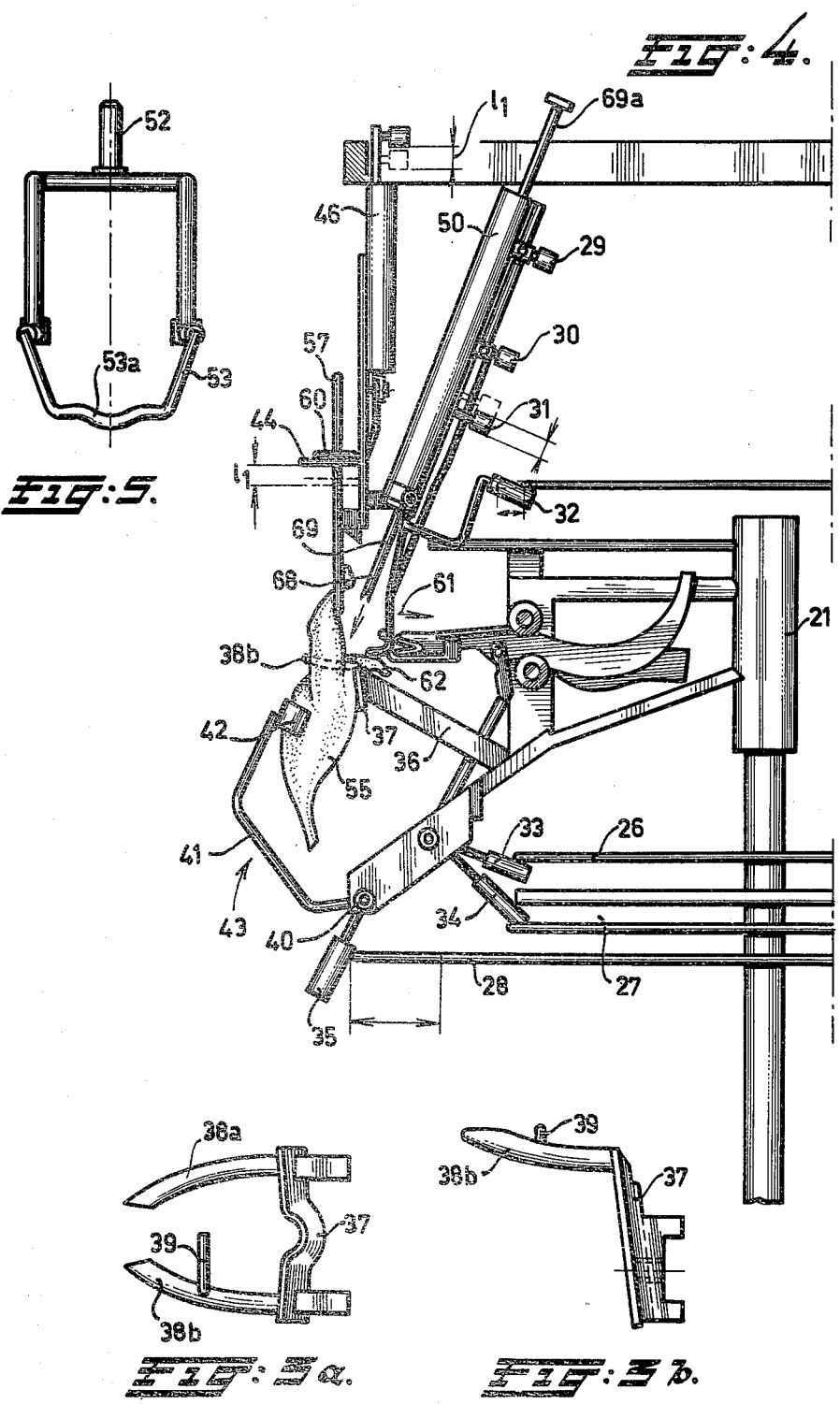

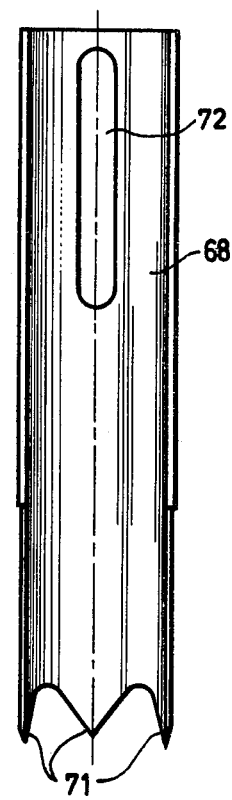
FIG:6.b.
FIG:6a
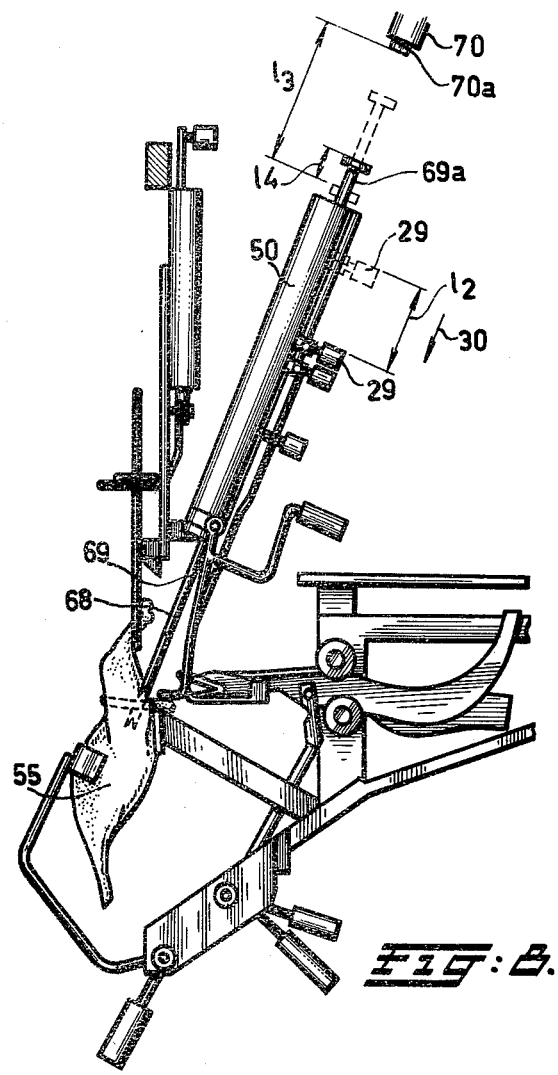
FIG:6.
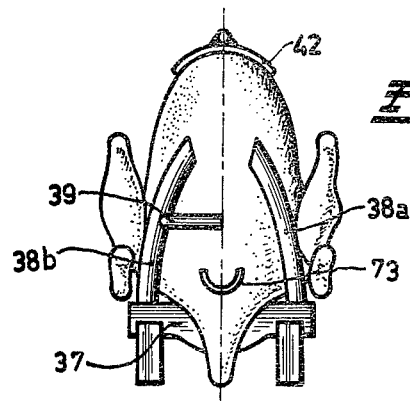
FIG:7.

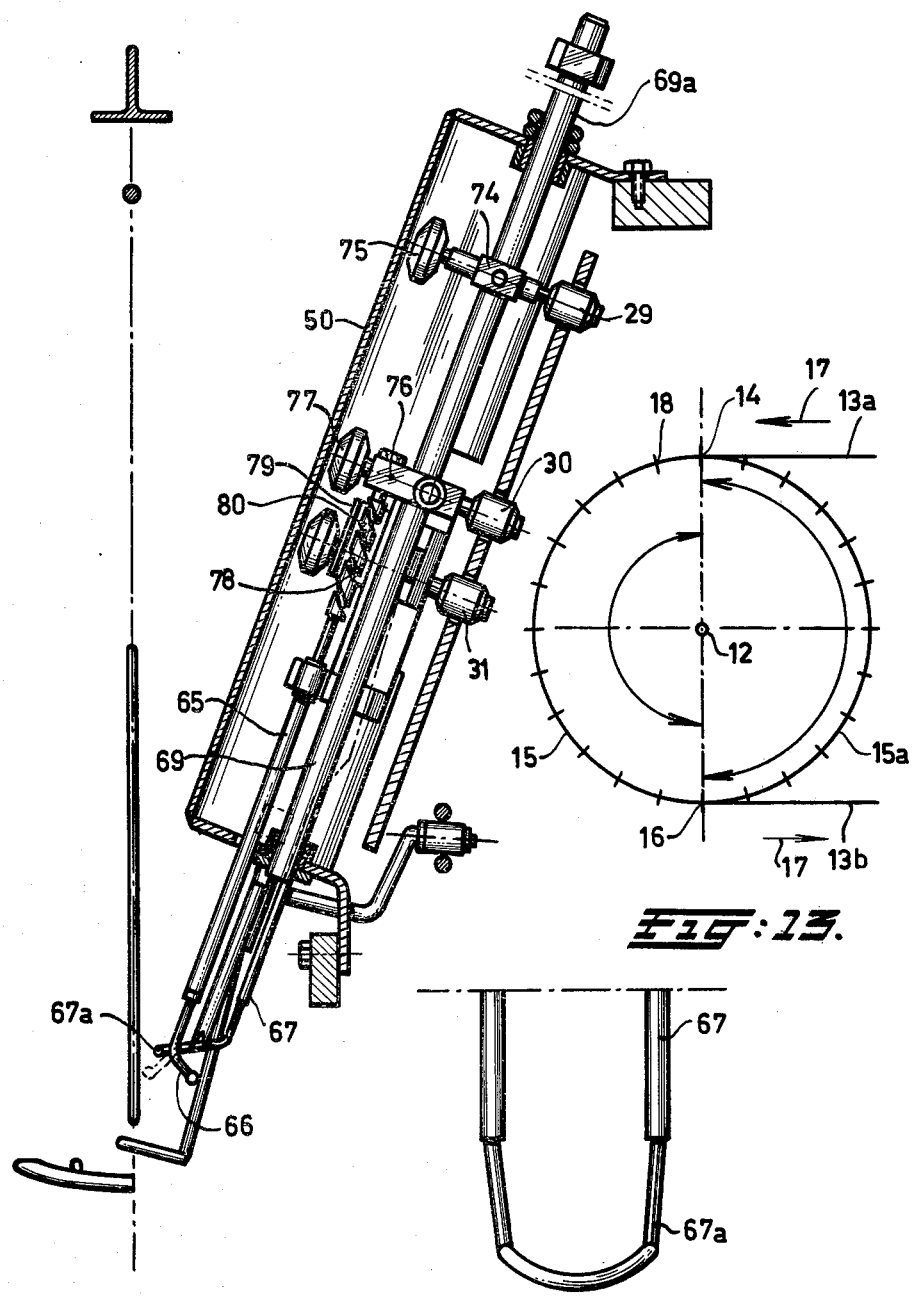

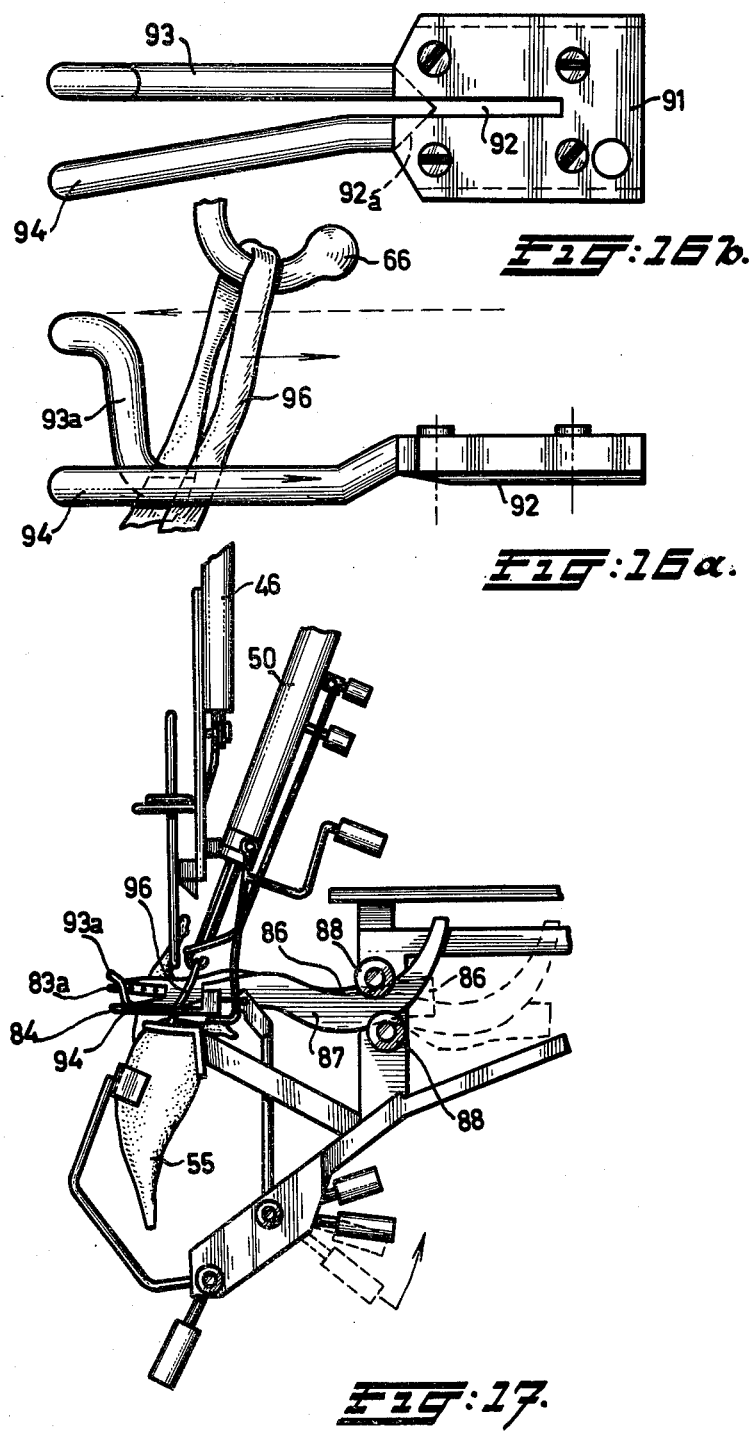

4,131,973

DEVICE AND METHOD FOR MAKING A CUT IN THE ANAL REGION OF A BIRD

BACKGROUND OF THE INVENTION

My invention relates to a device for making a cut in the region of the anus of a bird which is hanging by its legs on a shackle, the device further comprising positioning means and a cutting member.

When processing slaughtered poultry at a particular stage of the treatment a cut should be made in the skin of the anal region in order to remove at a later stage the intestines by either a manually or a mechanically performed operation. Should the cut be made mechanically— for which onject an apparatus is proposed in Netherlands Patent Application No. 7303652— laid open for public inspection — problems, owing to the inevitable difference in dimensions of poultry, arise in relation to positioning the bird relative to the cutting member in such a way that a cut made at the exact point and without damaging the intestinal tract is ensured.

SUMMARY OF THE INVENTION

My invention aims to obviate these difficulties and to provide a device of the kind as mentioned hereinbefore by which poultry of different dimensions can be treated in the desired way. To that aim the positioning means according to the invention comprise:
- a first member which is to be brought into contact with the backside of the bird, comprising a stop for the back of the bird,
- a second lower member, to be brought into contact with the breastside of the bird, comprising a stop for the breast of the bird, whereby at least one of these members can embrace the bird in a substantially horizontal plane,
- a third member, situated over the first member, having a stop for delimiting the movement of the bird in a vertical direction, and
- means for moving the bird relative to the third member in a vertical direction until the bird abuts this third member.

On positioning the bird, the same is by its backside brought into contact with the first member, whereupon the bird is moved in a vertical direction until the anus region bears against the third member. The second member is pressed against the breastside of the bird with the result that not only a fixation in a vertical direction but also a fixation of the anus region in a horizontal direction is obtained.

The first member is preferably a curved plate-shaped stop which cooperates with the back of the bird under the tail.

The second member consists preferably of a curved plate-shaped stop which can at least partially embrace the bird.

The third member is preferably fork-shaped with such a spacing between the two tines that they enclose that part of the anus region in which the cut should be made; the third member is preferably carried by the first member.

In a simple embodiment the first member is stationary and the second member is disposed at one end of an L-shaped strap, the other end of which can rotate around a horizontal shaft.

Displacement of the bird in a vertical direction is preferably obtained by means acting on the shackle on which the bird is hanging by its legs.

The knife has preferably a substantially semicircular cutting face having projecting teeth and is preferably secured to the end of an oblong carrier movable in the longitudinal direction thereof.

Preferably a strap is used which can be swung to over the anus region and which is movable in the direction of the first member, while this strap embraces the tail of the bird and pushes the same away when it moves towards the first member.

When the intestines of the poultry at a further stage of the treatment are mechanically removed by means of a spoon-shaped member to be introduced into the body of the poultry, then, in addition to the semicircular incision, an oblong cut is made in the arse region, the end of the intestinal tract and the cloaca are removed from the skin and this end is brought outside the body of the bird so that an inspection thereof is possible.

A device for performing these operations comprises a hook-shaped member to be introduced through the cut in the arse region which member is carried by an oblong carrier, at right angles with the plane of the hook, which can rotate in a substantially vertical plane around its longitudinal axis and which can move within an abutment strap fitting around the cut in the arse region, which together with the oblong strap can be moved towards the arse region of the bird and away therefrom, a first straight knife, movable through a substantially vertical plane, for cutting the bird from the pelvis as far as the breast bone, and a second straight knife movable in a substantially horizontal plane for severing the arse from the bird.

My invention also provides a method for making a cut in the arse region of a bird hanging by its legs on a conveying shackle comprising following stages:
- fixing the position of the bird in a horizontal plane by bringing the bird into contact with two stops which are movable with respect to each other,
- fixing the position of the bird in a vertical plane by causing the bird to contact in a vertical direction a third stop delimiting the vertical movement,
- the subsequent movement in a substantially vertical plane of a cutting member in the arse region of the bird; and a method for leading the end of the intestinal tract out of a bird after a cut has been made in the arse region of the bird in the way as described hereinbefore, which comprises
- bringing a fourth stop round the opening made,
- introducing a hook-shaped member into the bird, via this opening,
- rotating this member through substantially 360°,
- removing the hook-shaped member from the bird,
- making a longitudinal cut in the bird, which extends from the arse as far as the breast bone,
- severing the arse from the bird at a point directly under the arse.

SURVEY OF THE DRAWINGS

FIGS. 1a, 1b and 1c show elevational views of a positioning frame and a shackle having a bird mounted thereon, in various operational positions thereof, FIG. 2 shows an elevational view of one embodiment of a treatment unit in a first operational position thereof, comprising a positioning frame, and a shackle carrying a bird, FIG. 3a shows an enlarged plan view of a supporting strap and arms of the treatment unit of FIG. 2, FIG. 3b shows an enlarged elevational view of the strap and arms of FIG. 3a, FIG. 4 shows an elevational view of the treatment unit and shackle of FIG. 2 in a second operational position thereof, FIG. 5 shows an enlarged plan view of a strap of the treatment unit of FIG. 2 for engaging the tail of the bird, FIG. 6a shows an enlarged side elevational view of a knife of the treatment unit of FIGS. 4 and 8, FIG. 6b shows an enlarged plan view of the knife of FIG. 6a, FIG. 7 shows a plan view of the bird positioned on the treatment unit of FIG. 8 having been cut by the knife.

FIGS. 8, 9 and 10 show, respectively, views of the treatment unit and shackle of FIG. 4 in a third, fourth and fifth operational position of the treatment unit, FIG. 11 shows an enlarged elevational view of a strap of the treatment unit of FIG. 10, FIG. 12 shows an elevational part-sectional view of the housing of the treatment unit of FIG. 2, FIG. 13 shows diagrammatically a track with treatment units disposed therealong, FIG. 14 shows a plan view of the bird, positioned on the treatment unit of FIG. 15 and having an oblong cut therealong, FIG. 15 shows an elevational detailed view of the treatment unit and shackle of FIG. 2 in a sixth operational position of the treatment unit showing a knife with jaws, FIG. 16a shows an enlarged plan view of a further knife of FIG. 15 and a carrier therefor, FIG. 16b shows an enlarged elevational view of the knife and carrier of FIG. 16a, in use thereof, FIG. 17 shows an elevational view of the treatment unit and shackle of FIG. 15 in a seventh operational position of the treatment unit, and FIG. 18 shows an enlarged view of the treatment unit and shackle of FIG. 2 in an eighth operational position of the treatment unit.

DESCRIPTION OF PREFERRED EMBODIMENTS

Figure 1B:
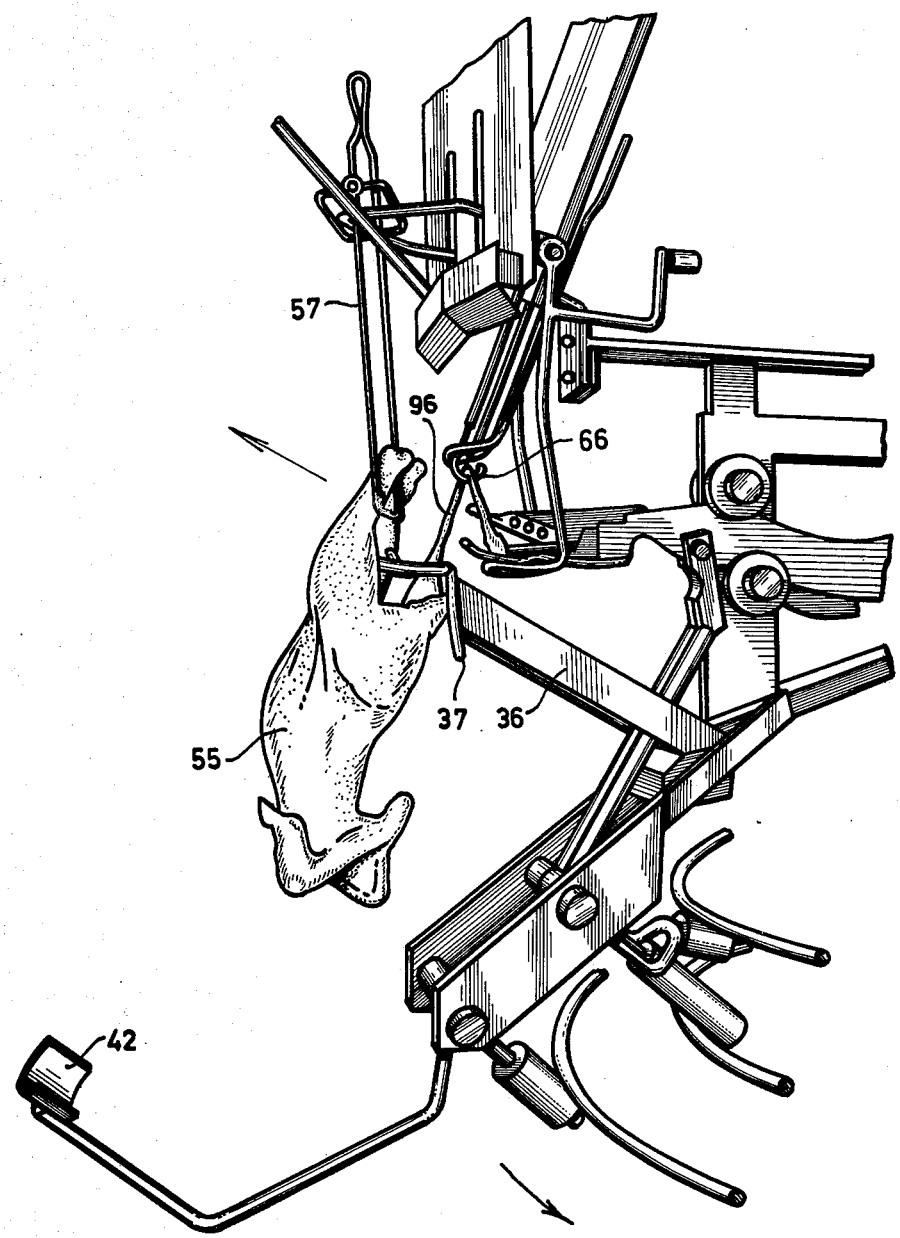

In FIGS. 1a to 1c, a stationary frame is shown, which carries a curved plate-like strap 2 having two arms 3 extending from the frame. An arm 4 is pivotally connected to the frame 1 and carries at the other end thereof a second strap 5 which is likewise manufactured from a plate-like material. A cam 6 disposed above the frame is movable in a vertical direction and cooperates with a stop 7 on a shackle 8. A bird 9 is hung by its legs 10 on the shackle 8 and, in this position, the bird 9 is advanced along a conveyor track (not shown), the back 11 of the bird being directed towards the frame 1.

The various aforementioned members cooperate in order to bring the bird into a particular position and to hold it in that position to enable a cut to be made by mechanical means in the region of the anus of the bird 9. The members operate as follows:

The bird 9 is moved toward the frame 1 until the back 11 of the bird 9 is in contact with the curved abutment strap 2 and the arms 3 are positioned in between the legs of the bird. The cam 6 then lies under the stop 7 on the shackle 8 (see FIG. 1b).

Subsequently, the cam 6 is moved upwardly thereby raising the shackle 8, by means of the stop 7, and lifting the bird 9 against the arms 3. At the same time, the strap 5 is moved towards the bird 9 (see FIG. 1b) until it contacts the bird (see FIG. 1c). The strap 5 presses on the breast of the bird 9 which bird 9 is now correctly positioned.

As will be described hereinafter, a swingable strap may be used which embraces the tail and pushes the same away in a backward direction, after the bird has entered an apparatus comprising treatment units.

An embodiment of a device, incorporating the positioning principle, for making a cut into the rear region of poultry and subsequently severing the intestinal tract will now be described. This device comprises a plurality of treatment units, one of which is represented in detail in FIGS. 2 to 18 of the drawings. The treatment units are driven in rotation around central shaft 12 (see FIG. 13) with an angular velocity such that their circumferential velocity is equal to the velocity at which the poultry is advanced along a conveyor track 13 along which the device is arranged. The track 13 describes a semicircle through the device. Part 13a of the track 13 merges at a point 14 into a curved part 15 which describes an angle of 180° and merges again at a point 16 into a straight part 13b of the track 13. The direction of movement along the track 13 is indicated by the arrows 17, while the treatment units are diagrammatically represented by the cross stripes 18. In the embodiment as represented in FIG. 13, there are twenty-four treatment units. The poultry is introduced at the point 14 into a treatment unit arranged on this point, receives treatment along the semi-circular part 15 between the points 14 and 16, and leaves the device at the point 16. The treatment units can be cleaned and sterilized if need be along a semicircular part 15a of the track 13 between the points 14 and 16.

Figure 2:
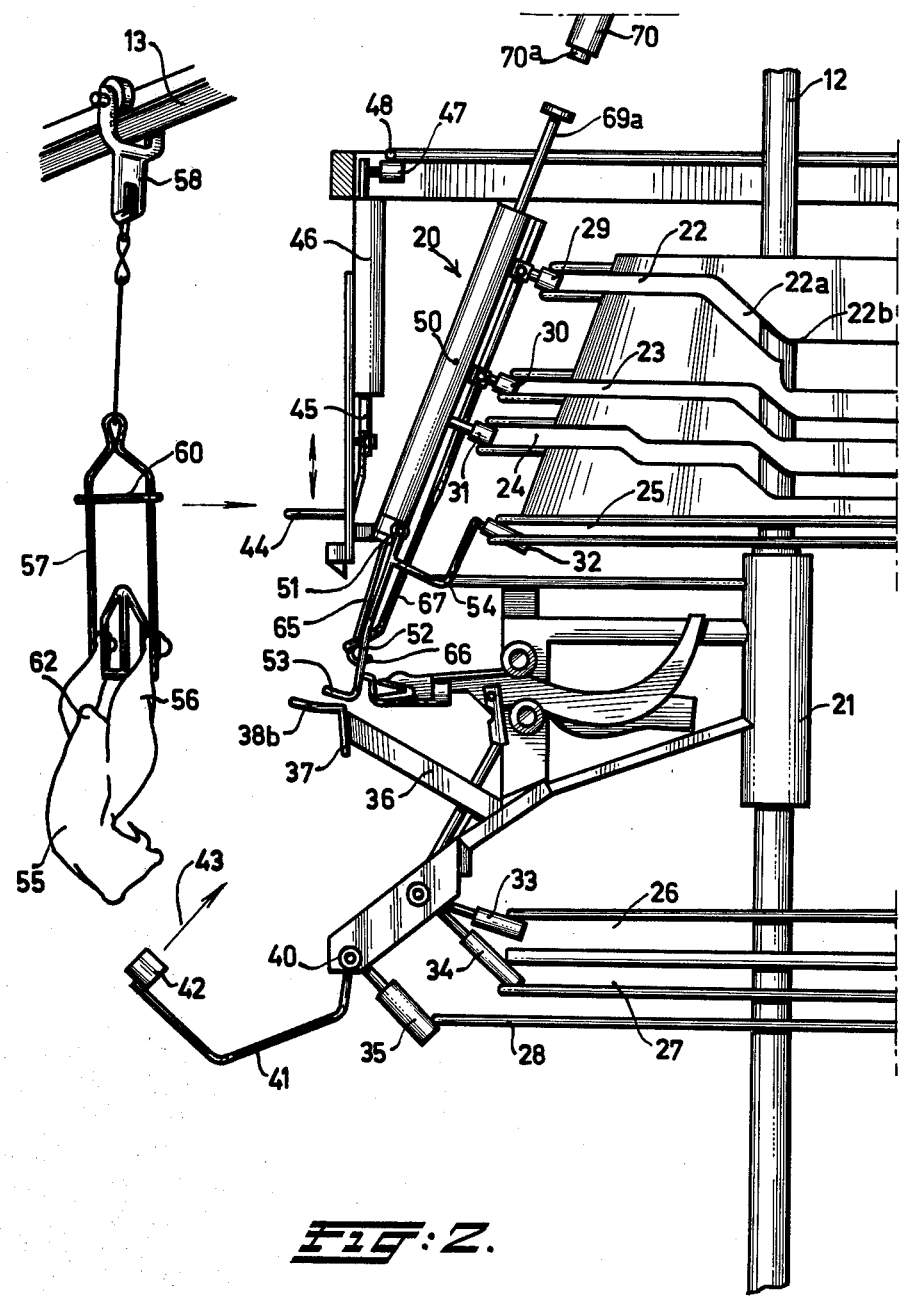

Such a treatment unit is denoted as a whole by 20 in FIG. 2. A carrier sleeve 21 rotatable around a stationary central shaft 12 carries the treatment units. The various movements of the components parts, which are described hereinafter, are caused, during the movement of unit 20, by curved guide paths 22 to 28 inclusive with which followers 29 to 36 cooperate.

The treatment unit carries, on the arm 36 a curved supporting strap 37 having arms 38a, 38b (see FIGS. 2 and 3a and 3b). The arm 38b carries a short rod 39. Each treatment unit further carries a curved arm 41 which is pivotally connected at the point 40 and is coupled to the follower 35, which follower 35 is controlled by the guide path 28. The arm 41 carries a curved breast strap 42. The latter can be moved in the direction of the arrow 43 towards the poultry, when the poultry is moved towards the treatment unit, and away from the same. Each unit further comprises a stop 44 secured to a rod 45 which rod 45 is slidably guided in a vertical direction in a housing 46 and is biassed upwardly by a spring (not shown). The rod 45 carries, at the upper end thereof protruding from the housing 46, a roller stop 47 which is pressed by the spring against a rail stop 48. The rail stop 48 extends on a part of a circle. When the roller stop 47 reaches the rail stop 48 and clears the rail stop, the roller stop 47 together with the stop 44 moves upwardly due to the action of the spring confined in the housing 46.

A plurality of elements is provided in a housing 50, which housing will be discussed hereinafter. The housing 50 carries an arm 52 which is pivotally connected at a point 51 at an end of the housing, and which ends in a strap 53 (see FIG. 5). The arm 52 is coupled by an arm 54 to the follower 32 which is guided in the guide path 25.

The bird 55 hangs by its legs 56 in the usual shackle 57, which by a roller guide 58, is suspended from the conveyor track 13 in the conventional manner. The circumferential velocity of the treatment units along the device is synchronized with the velocity of the shackles along the conveyor track 13. The following operations occur when a bird hanging on a shackle approaches a treatment unit and is introduced thereinto:

An abutment rod 60 on the shackle 57 comes to lie above the stop 44 while the hind part of the bird is introduced inbetween the arms 38a, 38b (see FIGS. 2 and 4). The strap 53, in its foremost position, embraces, by its bulged part 53a, the tail 62 of the bird which now lies within the strap 53. The back of the bird comes to bear against the strap 37 and the strap 42 is moved in the direction of arrow 43 towards the bird. These movements are caused, as previously stated, by the movement of the respective driving followers along their respective guide paths during the rotation of the treatment unit around the shaft 12. The rail 48 ends at a particular location at which the roller stop 47, due to the action of the compression spring (not shown), is lifted over a distance indicated by 1, in FIG. 4. As a result stop 44 engaged under the transverse rod 60, lifts the shackle 57 over an identical distance $l_1$ thereby drawing the bird up against the arms 38a, 38b. When the strap 42 has completed its movement and reaches the position shown in FIG. 4, the bird 55 is in position for receiving further treatment. The strap 53 moves backwardly in the direction of arrow 61 and presses the tail 62 away in a rearward direction. Now the first cut can be made.

A rod 65, ending at its lower end in a hook 66, is disposed in the housing 50 as will be described in more detail hereinafter, so as to be capable of movement in the longitudinal direction. This rod can moreover be rotated around its longitudinal axis. A strap 67 is coupled to the rod and, therefore, moves up and down with the rod 65. The housing furthermore guides an oblong punching knife 68 (shown in FIGS. 4 and 8 and 6a and 6b) which is coupled to a carrier rod 69, is operable on its end 69a by a pneumatic cylinder 70 and is coupled to the follower 29 which follower 29 is movable along the guide path 22. The follower 30 and the guide path 23 cause the rod 65 with the hook 66 to move up and down together with the strap 67, while the follower 31 causes the hook 66 to rotate. The knife 68 is semicircular in cross-section and has three sharp points 71 at its lower end. The knife 68 can be adjustably secured to the carrier rod 69 by means of fixing screws (not shown) which can protrude through an elongated hole 72 extending along the knife 68 (see FIG. 6a). When the treatment unit turns on the shaft 12 and, as a result, the followers move along their respective guide path, the follower 29, on reaching an inclined part 22a of the path 22 moves downwardly rather slow causing the knife 68 also to move downwardly until the points 71 of the knife contact the bird. When the follower 29 reaches part 22b of the guide path 22, the pneumatic cylinder 70 is activated by a mechanism (not shown) and the protruding piston rod 70a vigorously hits the end of the rod 69a, thereby pushing the knife 68 with a fast movement into the bird.

FIG. 7 shows the cut, denoted by the reference numeral 73 made in the bird.

During the downward movement of the knife 68, the hook 66 is turned away from the path of the knife. When the knife moves up, the hook returns to its former position.

FIG. 8 shows diagrammatically the movements of the cutting knife 68. The follower 29 has moved down the distance $l_2$ in the direction of the arrow 30a whereby the knife 68 has been moved to just contact the bird, the stroke of the pneumatic cylinder 70 is denoted by $l_3$, while $l_4$ indicates the distance the knife, under the action of the pneumatic cylinder, has been pushed into the bird.

Figure 9:
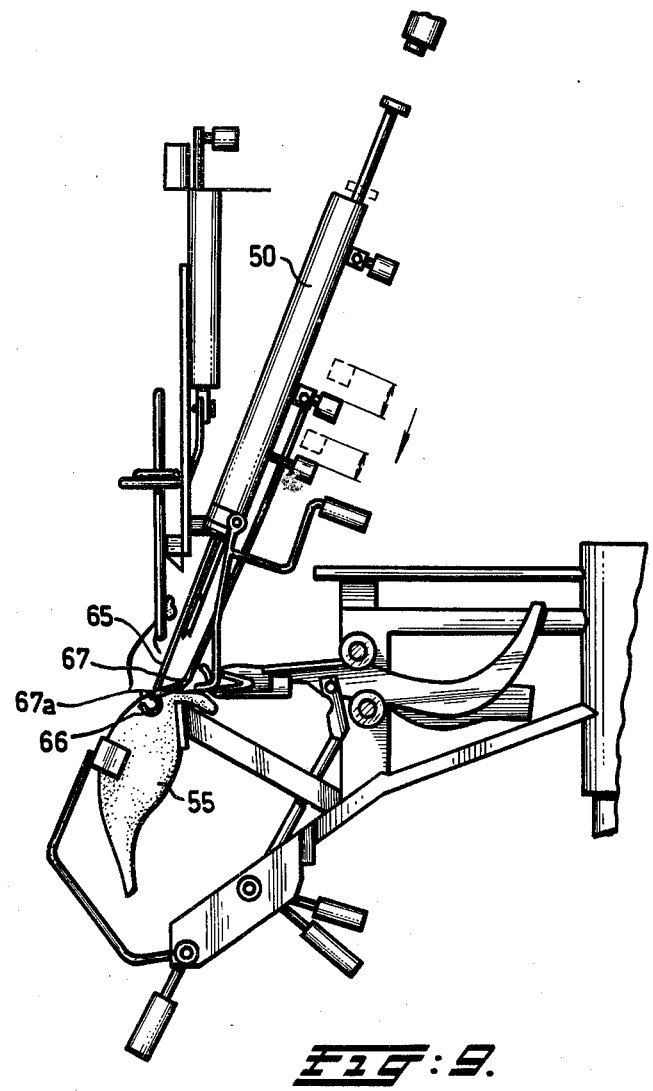
Figure 10:
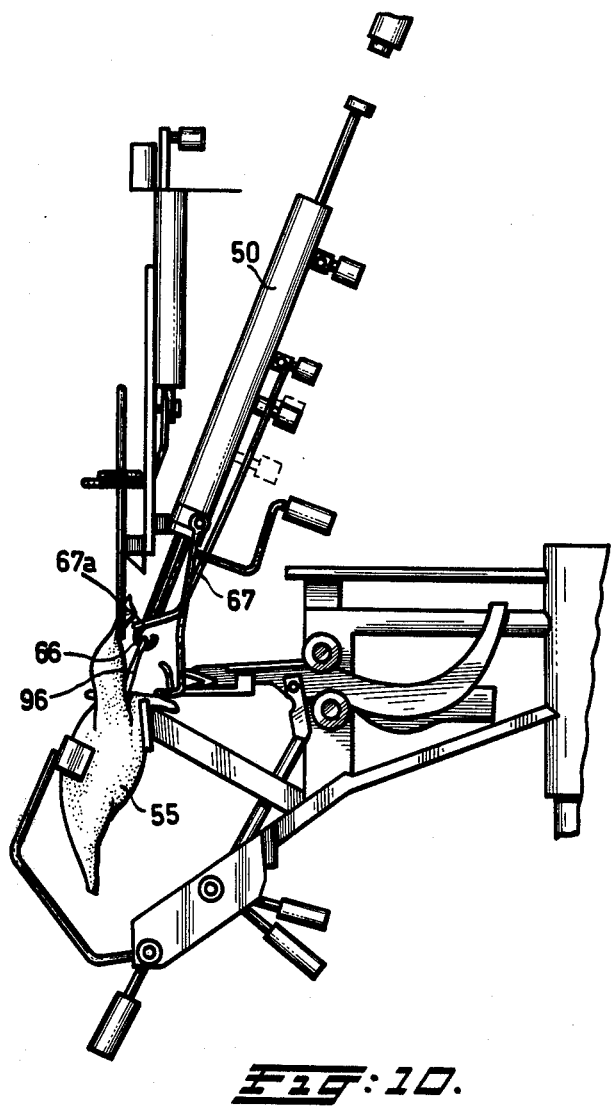

The hook 66 is now introduced into the cut made in the bird. The strap 67 and the hook 66 move downwardly together. The hook 66 penetrates into the bird over a small distance and the strap 67, the shape of an end 67a of which is shown in FIG. 11, bears on the outer skin of the bird as shown in FIG. 9. Once introduced into the bird, the hook 66 performs a rotary movement and is engaged behind the intestinal tract 96 (see FIG. 10). Subsequently, the strap and the hook are again moved upwardly. The hook turns always at the same depth under the skin as the distance between hook and strap is fixed.

FIG. 11 shows the hook 66 in the retracted position thereof.

FIG. 12 shows in detail the housing 50 and the members accommodated therein. The rod 69, the lower end of which carries the knife 68 and the upper end 69a which cooperates with the pneumatic cylinder 70 is slidably guided in a longitudinal direction in the housing 50. A first carrier 74 having a guide roller 75 and a follower 29 is secured to the rod 69.

A second carrier 76, coupled to the follower 30 and to the guide roller 77 is situated in the housing and can move around the rod 69 independently of the movement thereof. The carrier 76 carries the strap 67 and the rod 65, which rod 65 is rotatably supported in the carrier 76 and terminates in the hook 66. The rod 65 terminates at the other end thereof in a screw part 78 accommodated in a housing 79 having a pin 80 which protrudes into the thread of the screw part 78. The housing 79 is coupled to the follower 31. As a result movement in the vertical direction of the follower 31 which displaces the housing 79 with respect to the housing 50, causes the rod 65 with the hook 66 to rotate due to the cooperation of the pin 80 with the thread of the screw part 78.

During the displacement of the carrier 76 and consequently of the strap 67 and the rod 65, the rod 65 can, therefore, be rotated about its axis independently of the movement in a vertical direction, by a suitable displacement of the follower 31. The guide paths 23 and 24 are shaped so as to give the desired movement.

Figure 14:
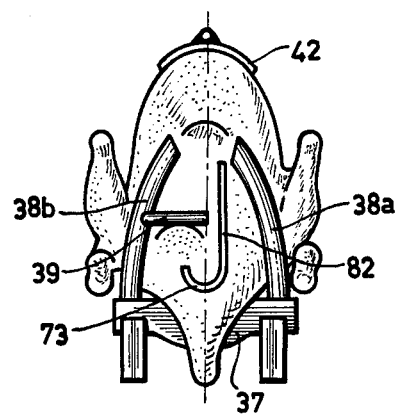
Figure 15:
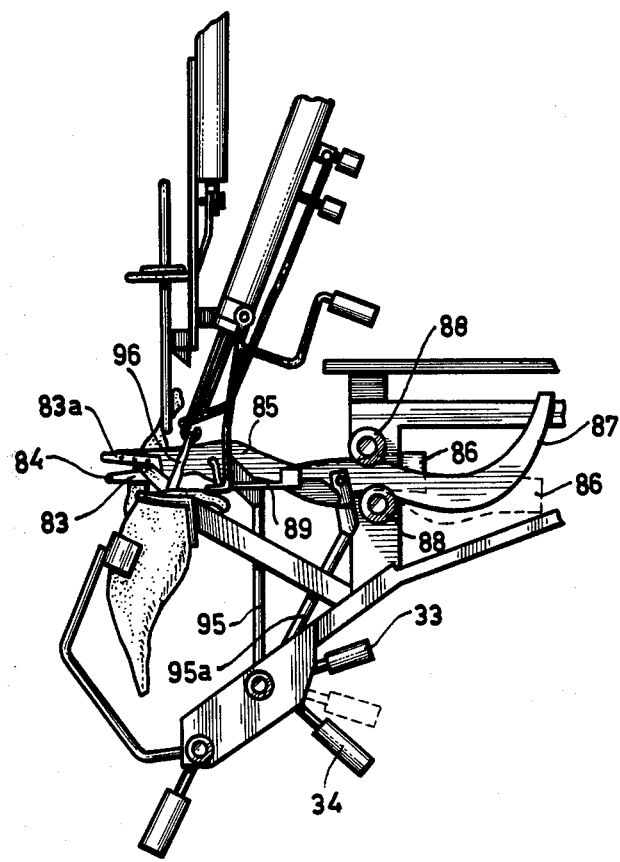

The cut 73 made into the bird and through which the intestinal tract is pulled outwardly by means of the hook 65 should preferably be supplemented by a longer oblong cut reaching as far as the breast bone of the bird and denoted by the reference numeral 82 shown in FIG. 14. This cut is made by a knife having jaws 83, 83a which is movable in a vertical plane and ends in an obtuse point 84. The knife is mounted on a substantially oblong carrier 85 with a special downwardly deflected end (see FIG. 15). The carrier 85 is guided between two guide rollers, which are not visible in the figure, and is situated beside a second carrier 87. The latter is guided between two guide rollers 88 and is extended forwardly toward the bird by a lengthening piece 89 at the end of which is disposed a knife carrier 91 (see FIGS. 16a, 16b) with a knife 92 situated in a horizontal plane and having fingers 93, 94. The carrier 85 is coupled to the follower 34 by coupling rod 95 and the carrier 87 is coupled to the follower 33 by a rod 95a.

The action of these members is as follows. Due to the typical bulged shape of the part 86 of the carrier 85, the knife 83 performs during its forward movement a kind of scooping movement whereby the obtuse point 84 enters the bird and pushes up the skin of the bird. The cutting edge provided between the lower jaw 83 and the upper jaw 83a makes the cut 82. cross rod After the return movement of the knife, the carrier 87 is moved forward for cutting through the intestinal tract (see FIG. 17). As shown in FIGS. 16a and 16b, the finger 93 has an upwardly directed end 93a and the whole is positioned in such a way that the end of the finger 93a moves just underneath the hook 66. As a consequence, the finger 93a always moves through a loop formed by the intestinal tract 96 of the bird hanging on the hook 66. The cutting edge 92a of the knife 91 cuts the intestinal tract loose. The short cross rod 39 (see FIG. 14) on the arm 38b prevents too much skin from being pulled along with the cloaca.

Finally the bird is removed from the treatment unit, that is when the bird reaches the point 16 in FIG. 13. The strap 42 swings down, the cross rod 60 clears the stop 44 and the bird leaves the treatment unit while the end of the intestinal tract is hanging outside the body (see FIG. 18). It should be noted that in the various figures particular parts are not shown for the sake of clarity so that specific parts of the treatment unit discussed in detail in the specification are clearly visible.

What I claim is:

1. Device for making a cut in the anal region of a bird hanging by its legs on a conveying shackle, and comprising a first member engageable with the backside of the bird to define a stop for the back of the bird, a second member movable with respect to said first member spaced downwardly from said first member and engageable with the breast of the bird to define a stop for the breast of the bird, at least one of said first and second members having means thereon for embracing the bird in a substantially horizontal plane, a third member positioned above said first member engageable with the rear portion of the bird to define a stop for the bird in the vertical upward direction, means for moving such shackle and bird hung therefrom horizontally until the bird engages said first member and vertically upwardly until the bird contacts said third member, means for moving such second member into contact with the breast of the bird such that said first, second and third members in contact with the bird retain the bird in a fixed position, carrier means above said first and third members and reciprocable in a substantially vertical direction toward and away from the anal region of a bird retained in the fixed position, and a cutting element on said carrier member to make a cut in the anal region of the bird upon movement of the carrier means toward the bird such that an opening is made through which the intestinal tract may be withdrawn, said cutting element comprising a knife having a substantially semicircular cutting face with projecting teeth, said knife being secured at the end of an oblong carrier which is reciprocable in the longitudinal direction thereof, and further comprising a strap movable in the direction of the first member to a position over the anal region of the bird to embrace the tail of the bird, a hook-shaped member to be introduced through the cut in the anal region and carried by said oblong carrier at right angles with the place of the hook, said hook being rotatable in a substantially vertical plane round its longitudinal axis and movable within said strap positioned around the cut in the anal region, said hook and the strap being movable toward the anal region of the bird and away therefrom, a first straight knife, movable in a substantially vertical plane, for cutting the bird from the pelvis as far as the breastbone, and a second straight knife, movable in a substantially horizontal plane, for cutting through the intestinal tract of the bird.

2. Method for making a cut in the anal region of a bird hanging by its legs on a conveying shackle, comprising the following stages:
    fixing the position of the bird in a horizontal plane by bringing the bird into contact with first and second stops movable relative to each other,
    fixing the position of the bird in a vertical plane by causing the bird to contact in a vertical direction a third stop delimiting the vertical movement,
    and moving a cutting member in a substantially vertical plane into the anal region of the bird while the bird is in a fixed position,
    bringing a fourth stop around the opening made in the anal region,
    introducing a hook-shaped member into the bird, via this opening,
    rotating this member through substantially 360° to engage the intestinal tract,
    removing the hook-shaped member from the bird to withdraw the intestinal tract,
    making a longitudinal cut in the bird, which extends from the anal region as far as the breastbone,
    severing the intestinal tract from the bird at a point directly under the anal region.

* * * * *